No. 858,710. PATENTED JULY 2, 1907.
W. H. ELLAM.
APPLIANCE FOR MOTOR VEHICLE WHEELS TO PREVENT SKIDDING
AND SIDE SLIP.
APPLICATION FILED AUG. 7, 1906.
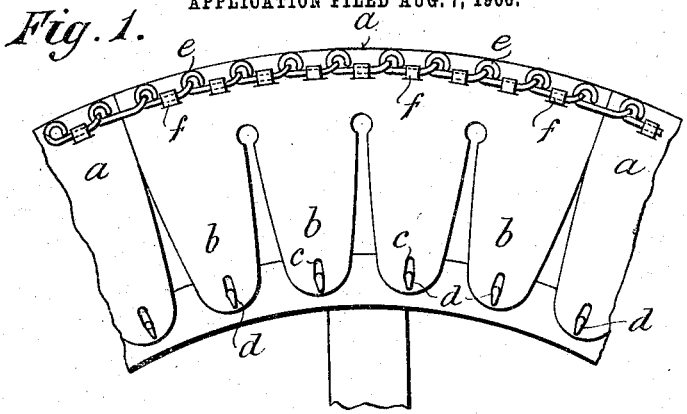
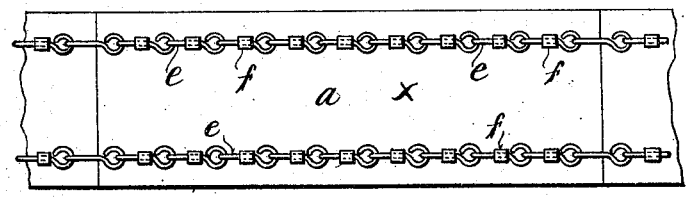
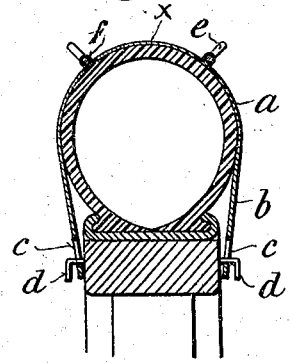
WITNESSES:
René Bruine
William F. Martinez
INVENTOR:
William Henry Ellam,
By his Attorneys.
Arthur E. Fraser & Usina

UNITED STATES PATENT OFFICE.

WILLIAM HENRY ELLAM, OF ANERLEY, ENGLAND, ASSIGNOR OF ONE-HALF TO EDWARD THOMAS ELLIS, OF CROYDON, ENGLAND.

APPLIANCE FOR MOTOR-VEHICLE WHEELS TO PREVENT SKIDDING AND SIDE SLIP.

No. 858,710.  Specification of Letters Patent.  Patented July 2, 1907.

Application filed August 7, 1906. Serial No. 329,542.

*To all whom it may concern:*

Be it known that I, WILLIAM HENRY ELLAM, artist, of "Keswick," Croydon Road, Anerley, Surrey, England, have invented certain new and useful Improved Appliance for Motor-Vehicle Wheels to Prevent Skidding and Side Slips, of which the following is a specification.

This invention relates to tires for motor vehicle wheels and has for its object to provide means for preventing side slip or skidding.

In all constructions hitherto proposed where side slip is prevented by means of chains disposed upon the tread of the tire the said chains have been distributed over the tire tread in such manner that they had to take the weight of the vehicle during ordinary running and consequently the chains were subject to undue wear and the constant presence of the chains between the tire and the road tended to damage the tire to a serious extent.

By the present invention we so dispose the chain or equivalently a row of links, studs or other metallic projections at the sides of the tread as to allow the intermediate part of the tire or tread to come into contact with the road in the usual manner, the side chains only coming into operation to prevent side slip.

The invention preferably takes the form of an outer cover or band and this band is or may be formed of a number of sections or segments detachably secured around the tire and closely arranged so as to abut at their ends, said sections or segments being provided with non-slipping devices in the form of chains or studs, arranged lengthwise of the tread, or circumferentially of the tire, so that when the segments are assembled upon the tire an outer cover or band is obtained having circumferential rings or bands around the tread which afford an efficient safeguard against side slip and as the band is formed of segments, upon any part of the same becoming damaged or worn, repairs can easily be effected by substituting a new segment for that which is damaged, without disturbing the whole.

In the accompanying drawings two forms of the invention are illustrated in which Figure 1 is a part side elevation of a motor tire having the invention applied thereto. Fig. 2 is a plan of Fig. 1, Fig. 3 is a cross section of Fig. 1, and Fig. 4 is an enlarged detail.

Referring to the drawings, *a a* are segments of leather or other suitable material adapted when assembled upon the tire to form a continuous band or cover. The segments *a a* of the cover are preferably stamped or formed with extensions or tongues *b* provided with eyelets or slits *c* which engage upon the hooks or projections *d* on the wheel rim, and effectually hold the cover upon the tire. For the purposes of securing a firm attachment the pins are fitted with hooked ends projecting towards the center of the wheel so that after the slits *c* are placed thereon the inflation of the tire will prevent the tongues becoming detached from the hooks.

Along each side of the tread of the segments *a* of the outer cover or band are disposed two parallel rows of chains *e* of a corresponding length to that of the segments *a* and attached thereto by rivets in the form of staples *f* adapted to embrace the chain *e* and be riveted to the leather cover *a* as shown more particularly in Fig. 4. The abutting ends of the chain sections *a* are connected together and thus a band in segments but with continuous circumferential rows of chain upon the tread is obtained. If required the length of chain in each section need not be connected.

It will be seen that in normal running that part of the tread marked *x* will be in contact with the road while as soon as any side pressure or side slipping action is set up the chains on one side or the other or both sides will be pressed into contact with the road and will act as a means for retarding and preventing the side slip. Further by the use of a leather segmental cover, should any portion of the tread become damaged, the segment containing such damaged part can be readily replaced. The leather cover also protects the tire from the road and from any strains put upon the tire by the chains or links.

What I claim and desire to secure by Letters Patent is:—

1. The improved means for protecting the tires of motor vehicles and for preventing side slip thereof, comprising a segmental outer cover adapted to embrace the tire, the segments being separately detachable and adapted to be fastened to the rim thereof, said segmental cover having circumferential rings of chain disposed along the side of the tread thereof at such distance apart as will allow the segmental cover to bear upon the road between the chains, substantially as described.

2. The improved means for preventing side slip in motor vehicles comprising a wheel tire, a cover to said tire, means for securing the said tire to the rim of the wheel, circumferential rows of chain fastened to said cover and disposed so as to leave in the center of the tire tread such a width of the cover surface exposed that said exposed surface will come in contact with the road during normal running while the rows of chains at the side will come into operation when side slip tends to occur.

3. The improved means for preventing side slip in motor vehicles comprising a wheel tire, circumferential rows of chain connected to said tire and disposed so as to leave in the center of the tire tread such a width of the tread surface exposed that said exposed surface will come in contact with the road during normal running while the rows of chains at the side will come into operation when side slip tends to occur.

4. The improved means for preventing side slip in motor vehicles comprising a wheel tire, a cover to said tire means for securing the said tire to the rim of the wheel, circumferential rows of chain disposed around the tire tread, and said chains consisting of links having looped ends and bar like intermediate parts, means for securing said chains to the tire by means of said bar like parts, said circumferential rows of chain being so spaced apart as to leave in the center of the tire tread such a width of the cover surface exposed that said exposed surface will come in contact with the road during normal running while the rows of chains at the side will come into operation when side slip tends to occur.

In witness whereof, I have hereunto signed my name in the presence of two subscribing witnesses.

WILLIAM HENRY ELLAM.

Witnesses:
ALFRED B. CAMPBELL,
ALFRED NUTTING.